United States Patent [19]

Easterbrook et al.

[11] Patent Number: 5,433,100
[45] Date of Patent: Jul. 18, 1995

[54] APPARATUS FOR SPLIT SLEEVE AND TUBULAR BUSHING COLD EXPANSION

[75] Inventors: Eric T. Easterbrook; Todd L. Thompson, both of Kent; Mark R. Weiss, Seattle, all of Wash.

[73] Assignee: Fatigue Technology, Inc., Seattle, Wash.

[21] Appl. No.: 152,469

[22] Filed: Nov. 12, 1993

[51] Int. Cl.[6] ............................................. B21D 31/00
[52] U.S. Cl. .................................. 72/391.2; 72/391.4; 72/393; 29/446; 29/523
[58] Field of Search ................. 72/391.2, 391.4, 393; 29/446, 523

[56] References Cited

U.S. PATENT DOCUMENTS

| | | | |
|---|---|---|---|
| 2,405,399 | 8/1946 | Bugg et al. | 72/391.4 |
| 3,566,662 | 3/1971 | Champoux | 72/370 |
| 3,665,744 | 5/1972 | Harter | 72/129 |
| 4,187,708 | 2/1980 | Champoux | 72/30 |
| 4,386,515 | 6/1983 | Starke | 72/391.4 |
| 4,425,780 | 1/1984 | Champoux | 72/393 |
| 4,471,643 | 9/1984 | Champoux et al. | 72/391.4 |
| 4,524,600 | 6/1985 | Champoux et al. | 72/391.4 |
| 4,557,033 | 12/1985 | Champoux | 72/391.4 |
| 5,096,349 | 3/1992 | Landy et al. | 411/108 |
| 5,103,548 | 4/1992 | Reid et al. | 29/507 |

OTHER PUBLICATIONS

Article: "Fatigue Improvement by Sleeve Coldworking," by Joseph L. Phillips, from Nat. Aerosp. Eng. & Manuf. Meeting, Oct., 1973, Society of Automotive Engineers, Warrendale, Pa., pp. 1–12.

*Primary Examiner*—David Jones
*Attorney, Agent, or Firm*—David P. Campbell

[57] ABSTRACT

A nosepiece apparatus for use in conjunction with a pull gun for prestressing fastener holes, or the like, in a workpiece, the nosepiece including an adapter (12) having a central passageway (19) therethrough and a rear end (20) adapted to be mounted to a pull gun. The forward end of the adapter (12) has a threaded connection for coupling the adapter (12) to an extension piece (14). The extension piece (14) is an elongated, tubular extension having threaded connections at both ends. A sleeve retainer (16) is provided having a threaded connection at its rearward end for securing the sleeve retainer (16) to the extension. The forward end of the sleeve retainer (16) is formed by a multiple of annularly-spaced, alternate splits (56) and fingers (58) extending substantially axially from the rearward end of the sleeve retainer (16). The threaded connection of the sleeve retainer (16) is adapted not only to be threadably coupled to the extension piece (14), but also to be directly coupled to the adapter (12).

42 Claims, 9 Drawing Sheets

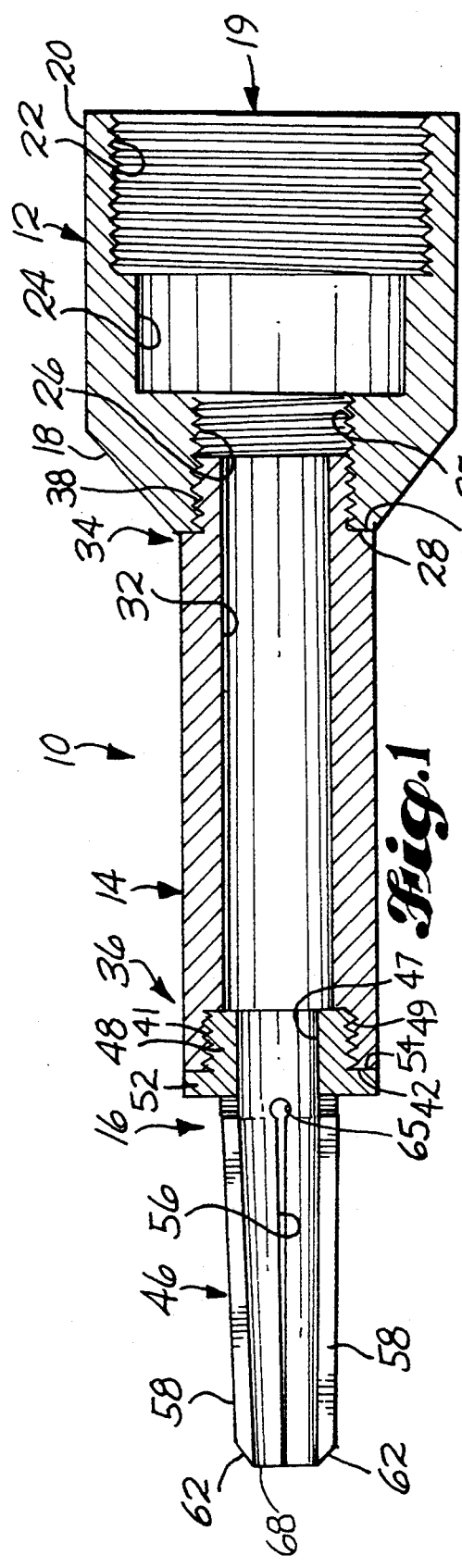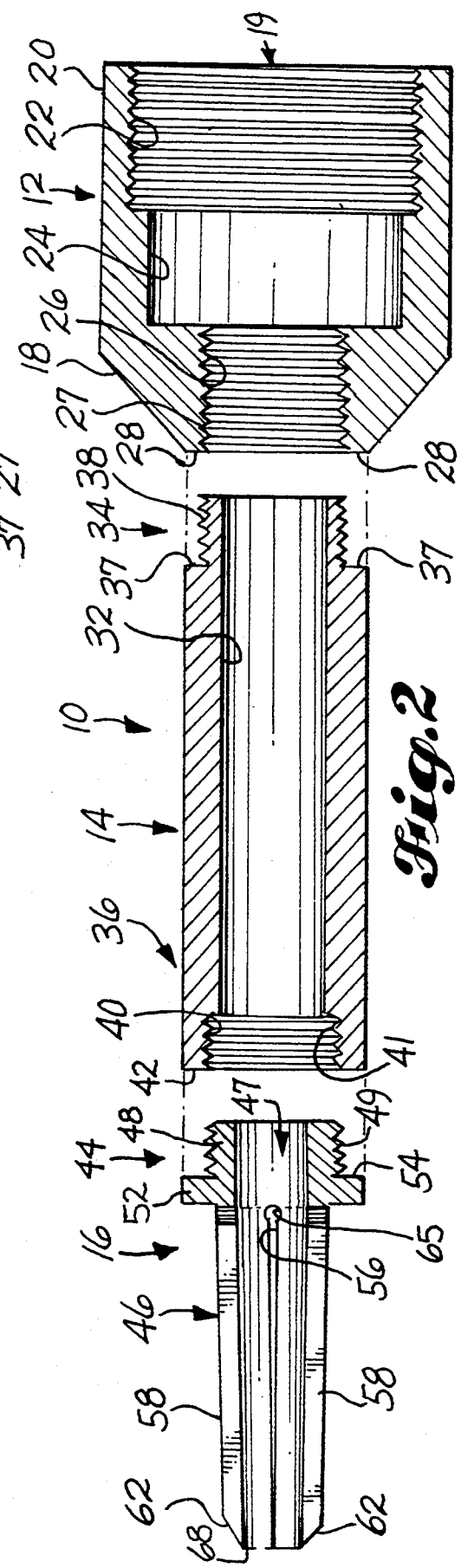

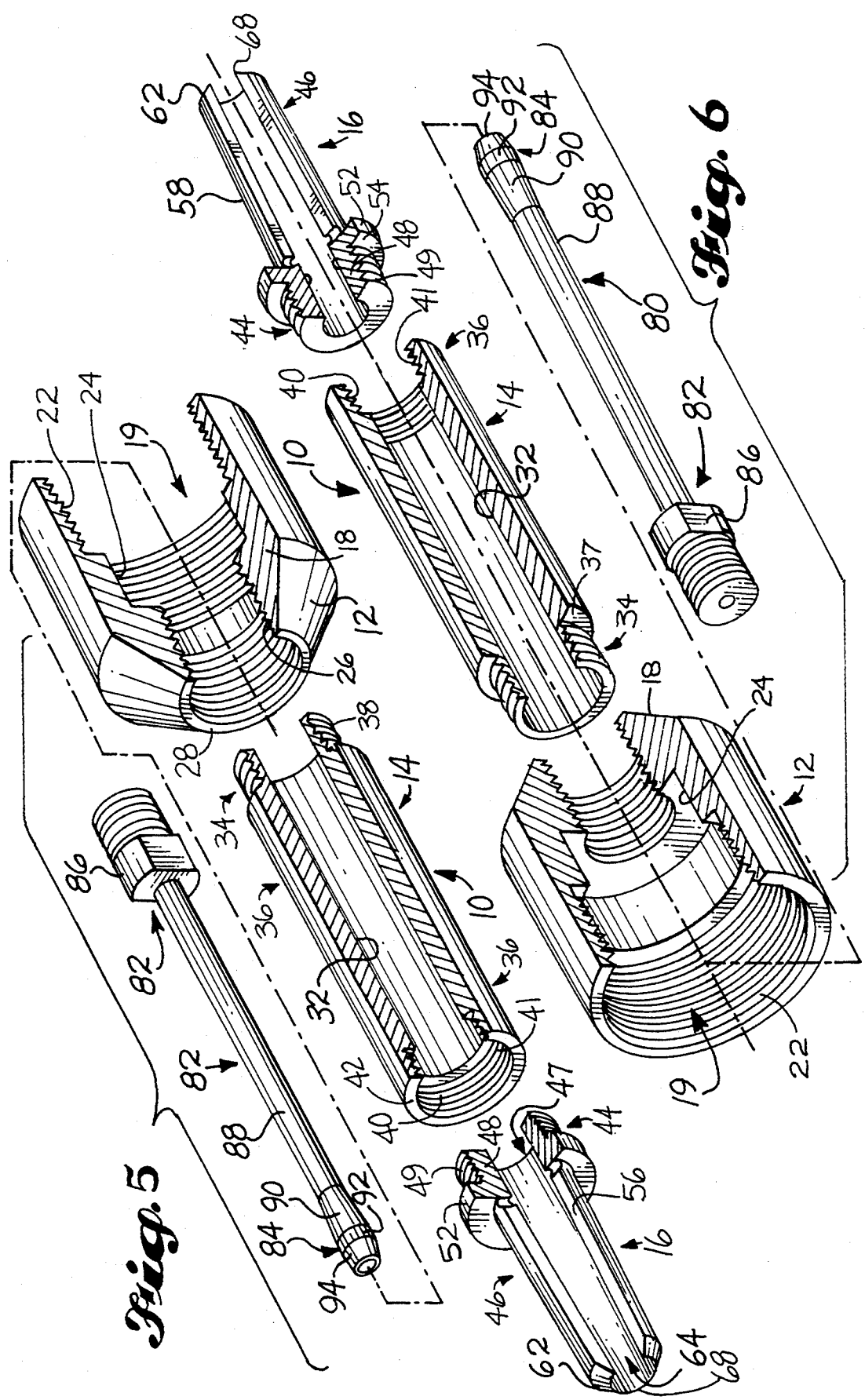

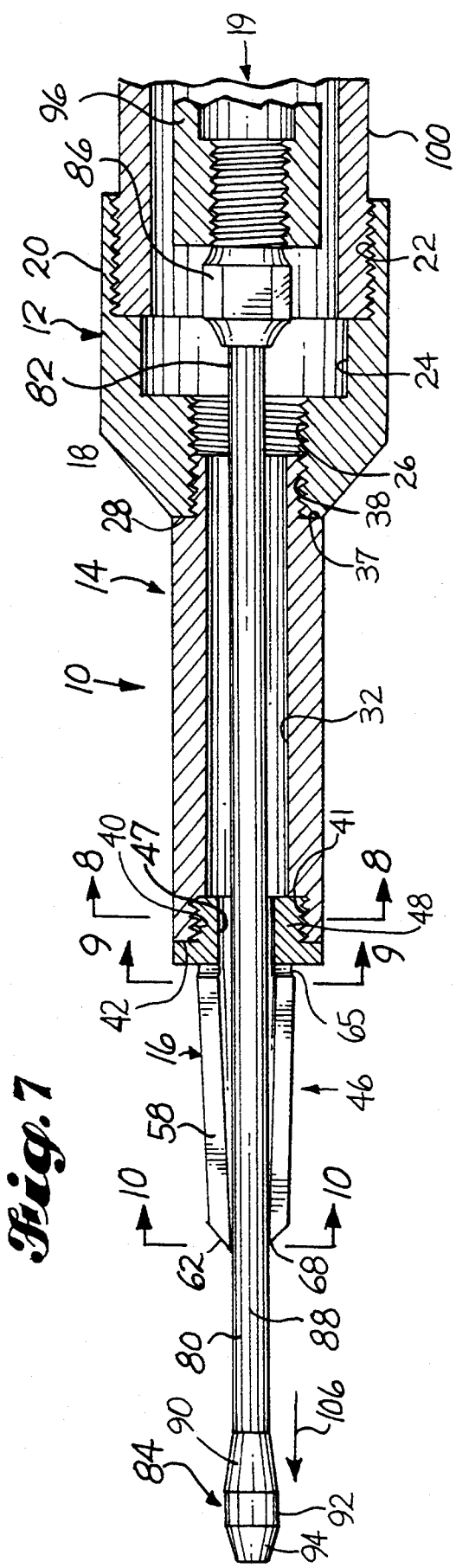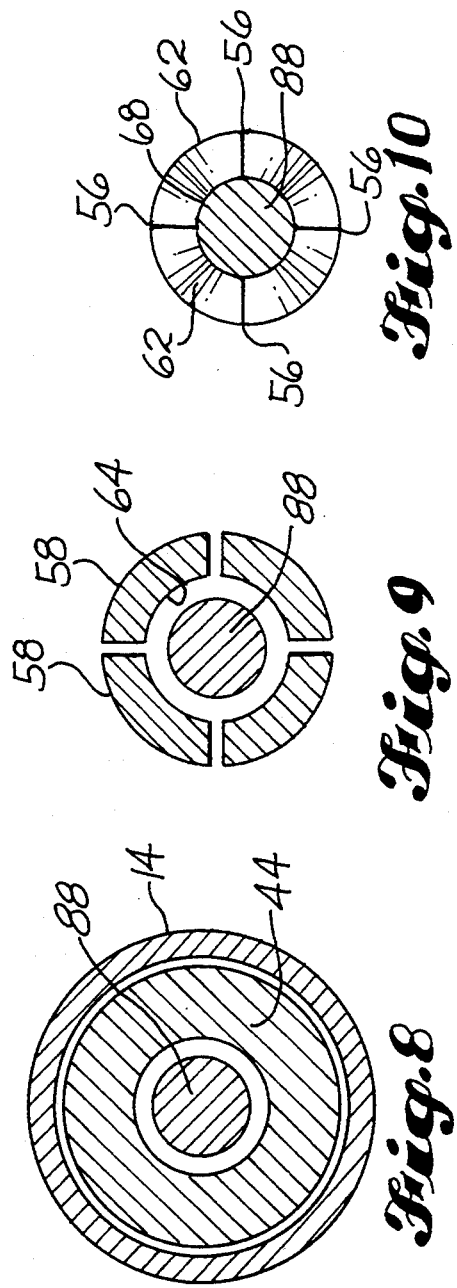
Fig. 7
Fig. 8
Fig. 9
Fig. 10

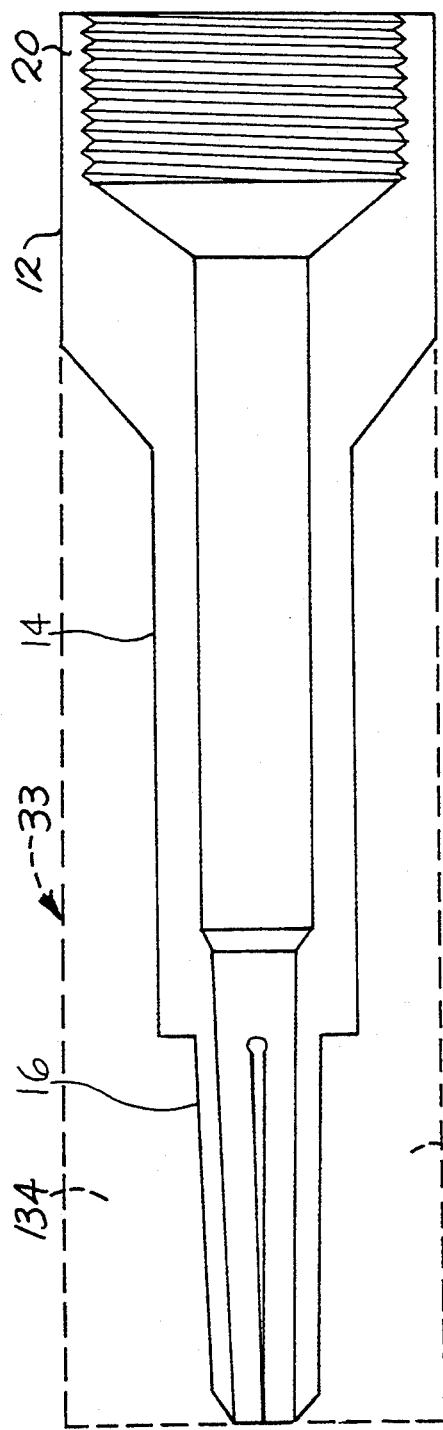
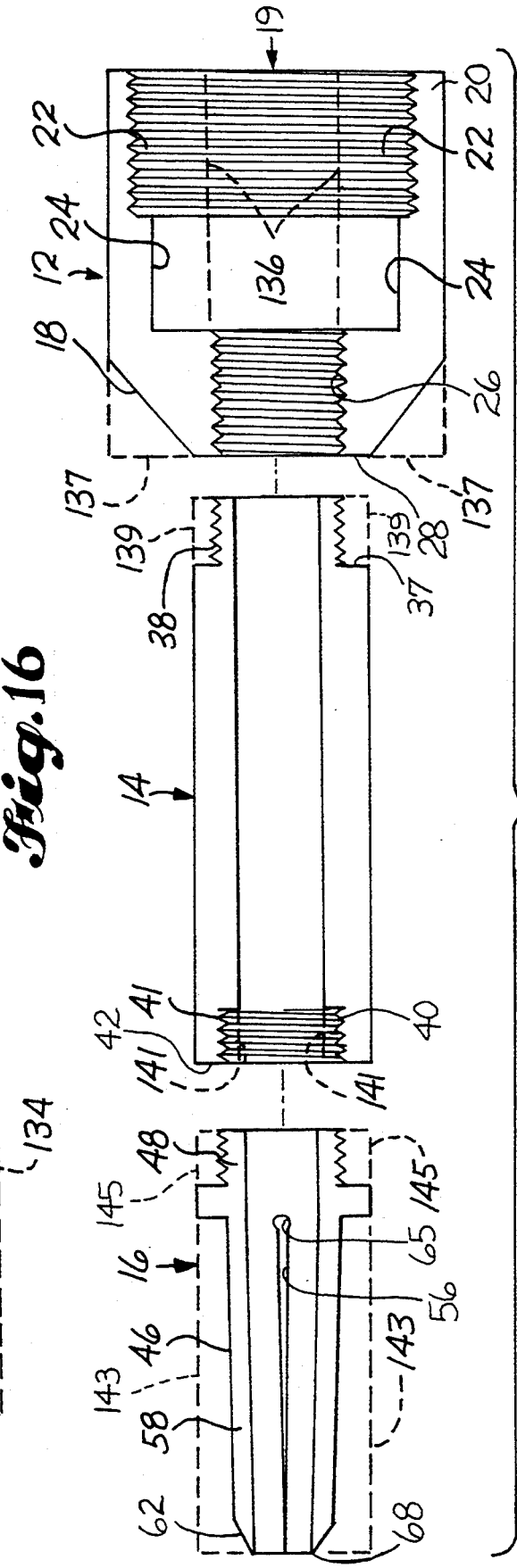
Fig. 16
Fig. 17

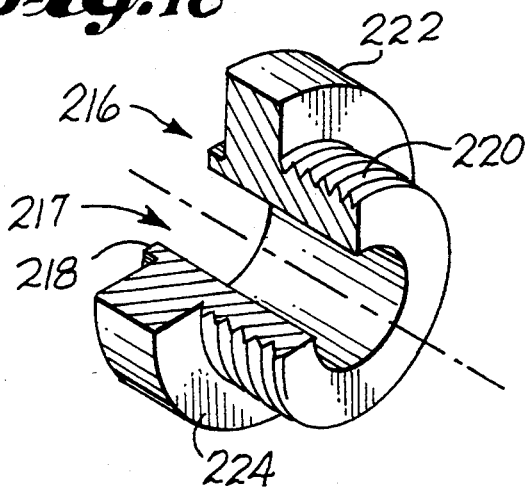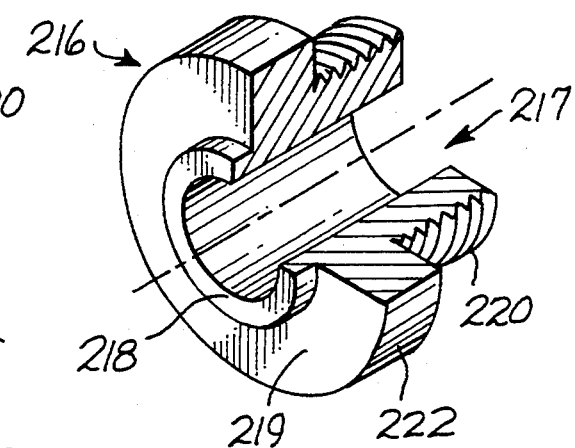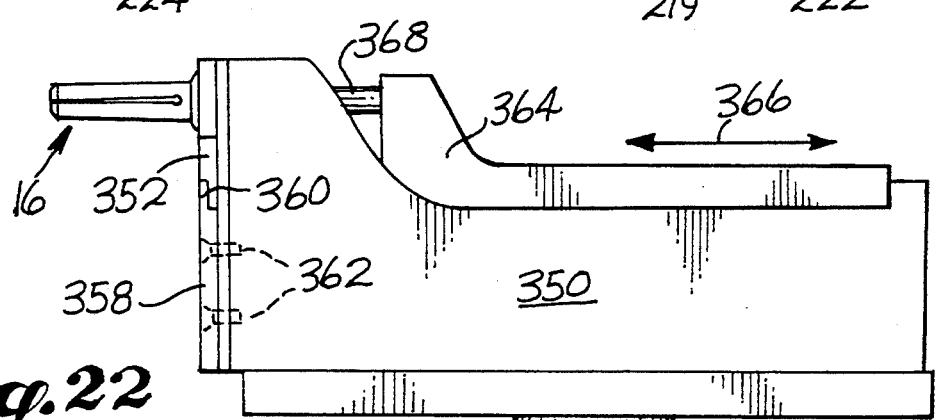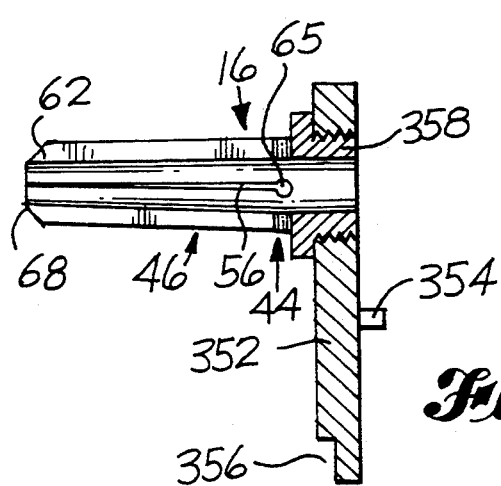

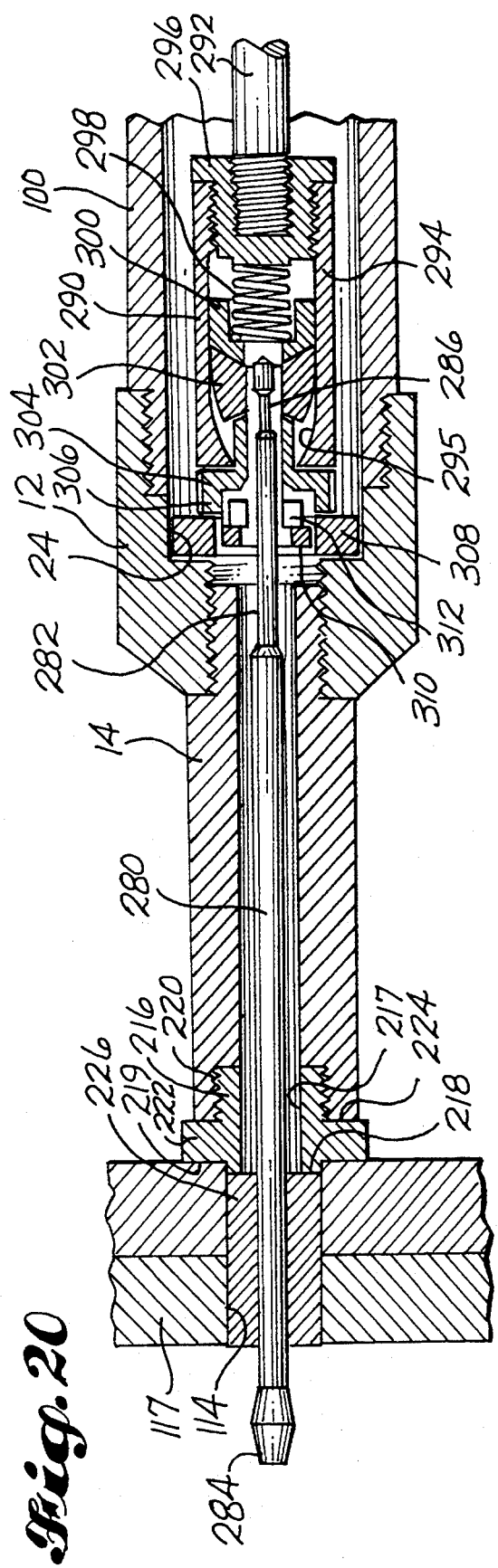
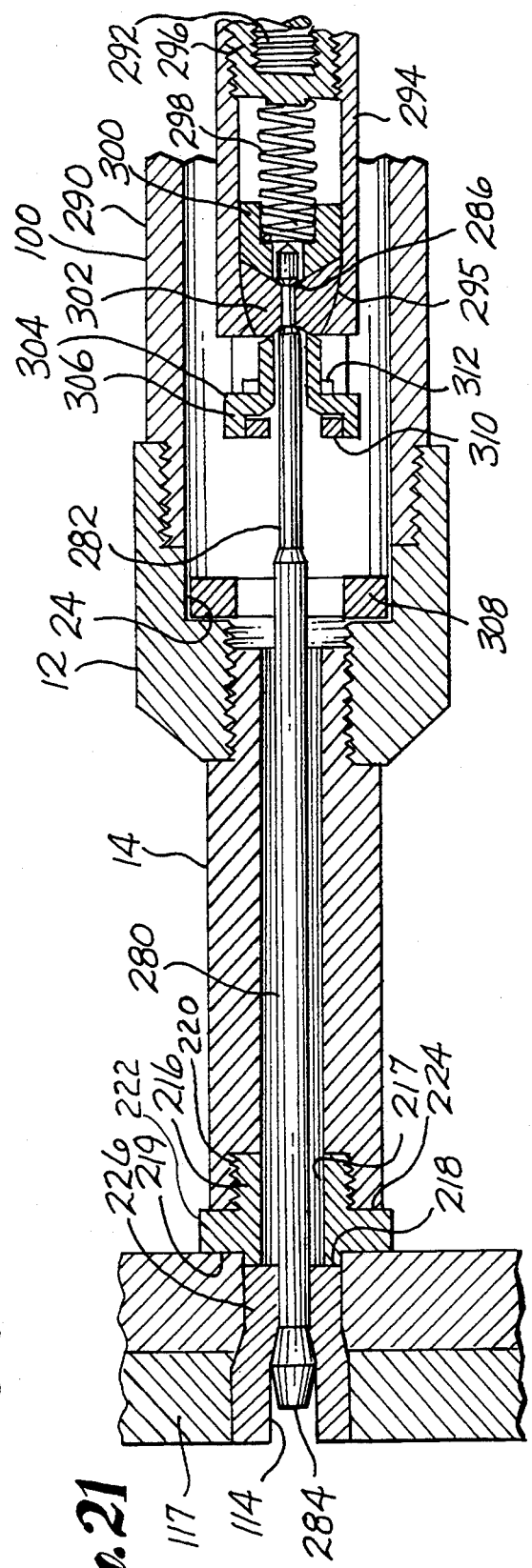

APPARATUS FOR SPLIT SLEEVE AND TUBULAR BUSHING COLD EXPANSION

TECHNICAL FIELD

This invention relates to improvements in apparatus of prestressing material surrounding fastener holes, and the like, in structural members, and/or for installing tubular bushings, or the like, into openings in structural members. In particular, the invention relates to the provision of improved tooling which includes a modular nosepiece and mandrel assembly.

BACKGROUND OF THE INVENTION

The use of tooling composed of a puller (including a nosepiece), a mandrel and a split sleeve, for prestressing material surrounding holes in structural members is described, for example, in U.S. Pat. No. 4,471,643, granted Sep. 18, 1982 to Robert L. Champoux and Charles M. Copple. This patent discloses (FIG. 9) a preferred nosepiece having a conical end that fits inside the flare of a split sleeve and transfers the pull force directly through the periphery of the hole. This patent also discusses the need that sometimes exists for a pull gun nosepiece that is relatively long and narrow. An object of the present invention is to provide tooling having the functional capabilities of the tooling disclosed in U.S. Pat. No. 4,471,643 but also permitting an easy and relatively inexpensive length change of the nosepiece and mandrel assembly by use of a reduced inventory of parts.

It is also known to use a puller (including a nosepiece), a mandrel and a split sleeve in combination for installing tubular bushings or the like into openings in structural members. By way of example, see U.S. Pat. No. 5,103,548, granted Apr. 14, 1992 to Leonard F. Reid and Roger T. Bolstad. By way of another example, see U.S. Pat. No. 5,096,349, granted Mar. 17, 1992, to Michael A. Landy, Roger T. Bolstad, Charles M. Copple, Darryl E. Quincey, Eric T. Easterbrook, Leonard F. Reid, and Louis A. Champoux.

The aforementioned patents, the references cited against them, and a paper by Joseph L. Phillips, entitled "Fatigue Improvement By Sleeve Coldworking", should be carefully considered for the purpose of putting the present invention into proper perspective relative to the prior art.

Herein, the expression "split sleeve cold expansion" is used to describe the use of a split sleeve and mandrel for radially expanding a workpiece. The term "workpiece" is used to include both a structural member that is radially expanded about an opening for the purposes of fatigue enhancement and a tubular sleeve that is being installed in an opening in a workpiece by radial expansion.

DISCLOSURE OF THE INVENTION

The nosepiece of the invention is characterized basically by a pull gun forward end portion, at least one elongated tubular extension, and a tubular sleeve-retainer piece. The pull gun forward end portion includes a central passageway and forward end threads. The tubular extension includes a rear end portion having rear end threads adapted to couple threadably with the forward end threads on the pull gun forward end portion. The tubular extension also has a front end portion including front end threads. The tubular, sleeve-retainer piece includes a forward end portion and a rearward end portion. The forward end portion is formed by a multiple of circumferentially-spaced, alternate splits and fingers extending substantially axially forward from the rearward end portion. The rearward end portion of the tubular sleeve-retainer piece includes rearward threads adapted to couple threadably to the front end threads on the tubular extension and to the forward end threads on the pull gun forward end portion. This nosepiece can be utilized without the extension and with the sleeve-retainer piece directly coupled to the pull gun forward end portion. It can also be utilized with the extension mounted between the retainer and the pull gun forward end portion, so as to in this manner, extend the position of the sleeve-retainer piece further away from the pull gun.

In preferred form, the rearward end portion of the sleeve-retainer piece includes a radial shoulder. The extension and the forward end portion of the pull gun both have a radial end wall, which is adapted to pressure engage the radial shoulder on the sleeve-retainer piece when it is threadably coupled to the sleeve-retainer piece.

Also in preferred form, the forward end of the sleeve-retainer piece is conical for fitting into a conical flare at an end of a sleeve, for holding the sleeve within the hole of the workpiece as the mandrel is pulled through the workpiece. During mandrel movement, the sleeve flare is clamped between the conical end of the sleeve-retainer piece and an edge of the hole in which the sleeve is located.

Preferably also, the forward end portion of the pull gun is an adapter that is removably connectable to the pull gun. This adapter has a rear end adapted to mount to the pull gun. The mounting may be by a threaded connection.

According to another aspect of the invention, a plurality of tubular extensions are provided. Each tubular extension is of a different length, but each includes a rear end portion having threads adapted to couple threadably with the forward end threads on the forward end portion of the pull gun. Each tubular extension also includes a front end portion with front end threads adapted to couple threadably with the rearward threads on the sleeve-retainer piece.

According to a further aspect of the invention, a first relatively short mandrel is employed when the sleeve-retainer piece is coupled directly to the forward end portion of the pull gun. Additional longer mandrels are provided, one for each tubular extension.

The tubular extensions can be manufactured in varying lengths. A worker utilizing the nosepiece of the present invention to coldwork a series of holes can have a supply of varying length extensions at hand. As the worker coldworks the holes, the worker can quickly and efficiently change out the extension pieces when obstacles are encountered that necessitate spacing the pull gun farther from or closer to the hole in the workpiece. The sleeve-retainer and pull gun forward end portion are universal in that they can be coupled to any of the extensions.

In an alternative embodiment of the present invention, the nosepiece is adapted for coldworking a tubular bushing in a hole in a workpiece in order to expand radially the tubular bushing and thereby mount the tubular bushing in the hole by interference fit and also coldwork the workpiece. In this alternative embodiment, the nosepiece includes a pull gun forward end portion having a central passageway and forward end threads. The nosepiece also includes an elongated, tubular extension. The tubular extension includes a rear end portion having rear end threads adapted to couple threadably with the forward end threads of the pull gun forward end portion. The tubular extension also ha a front end portion that has front end threads. The nosepiece further includes a tubular, bushing-retainer piece. The bushing-retainer includes a rearward end portion and a forward end portion. The forward end portion is formed by an annular projection extending substantially axially forwardly from the rear end portion. The rearward end portion of the bushing-retainer includes rearward threads adapted to couple threadably both to the front end threads of the tubular extension and to the forward end threads of the pull gun forward end portion. The nosepiece can be utilized without the extension and with the bushing-retainer piece directly coupled to the pull gun forward end portion, and can be utilized with the extension mounted between the retainer and the pull gun forward end portion.

According to another aspect of the invention, the annular projection of the forward end portion of the bushing-retainer is formed flush with the interior wall forming the tubular passageway of the bushing-retainer.

Preferably, the forward end portion of the pull gun is an adapter that is removably connectable to a pull gun, wherein the adapter has a rear end adapted to mount to the pull gun.

According to another aspect of the invention, a plurality of elongated tubular extensions of different lengths are provided. Each extension includes a rear end portion having threads adapted to couple threadably with the forward end threads on the forward end portion of the pull gun. Each extension also includes a front end portion having front end threads. With this arrangement, the nosepiece can be utilized without an extension and with the bushing-retainer piece directly coupled to the forward end portion of the pull gun, and can also be used with a selected one of the plurality of elongated extensions mounted between the bushing-retainer and the forward end portion of the pull gun.

According to a further aspect of the invention, a first relatively short mandrel is employed when the bushing-retainer is coupled directly to the forward end portion of the pull gun. Additional longer mandrels are provided, one for each tubular extension.

Like the nosepiece of the first embodiment of the present invention, a worker utilizing the nosepiece of the alternative embodiment to mount a series of tubular bushings in holes in a workpiece can have a supply of varying length extensions at hand. As the worker mounts and coldworks the tubular bushings in the holes, the worker can quickly and efficiently change out the extension pieces when obstacles are encountered that necessitate spacing the pull gun farther from or closer to the holes in the workpiece. The bushing-retainer and the pull gun forward end portion are universal in that they can be coupled to any of the extensions.

With the present invention, if a large obstacle, such as a structural member, is positioned adjacent the hole in the workpiece, a long extension piece can be mounted in the nosepiece between the retainer and the pull gun forward end portion or adapter. This long extension piece spaces the pull gun farther from the workpiece, allowing the nosepiece to extend adjacent the obstacle toward the workpiece. If an obstacle exists behind the pull gun, which obstacle restricts the area in front of the hole, the extension can be removed altogether and the sleeve-retainer mounted directly to the pull gun forward end portion. This provides a more compact configuration for coldworking in tight spaces.

Accordingly, an improved nosepiece is provided having an extension piece that is easily exchanged for other extension pieces of different lengths or removed altogether so that obstacles surrounding a workpiece no longer present a problem in coldworking the holes in the workpiece.

Other features and advantages of the present invention will become apparent from the following description of the best mode and the drawings and the claims, which are incorporated herein as a portion of the disclosure of the invention.

BRIEF DESCRIPTION OF THE DRAWINGS

Like reference numerals are used to indicate like parts throughout the various figures of the drawing, wherein:

FIG. 1 is a longitudinal sectional view of a preferred embodiment of the nosepiece of the present invention;

FIG. 2 is an exploded longitudinal sectional view of the nosepiece of FIG. 1;

FIG. 5 is exploded isometric view of the nosepiece of FIGS. 1-4 with a quarter-section removed, shown with the mandrel of the pull gun that is used in conjunction with the nosepiece, such view looking toward one side and the outer end of the nosepiece;

FIG. 6 is a view like FIG. 5 but looking toward the opposite side and the inner end of the nosepiece;

FIG. 7 is a longitudinal sectional view of the nosepiece of FIGS. 1-6 shown mounted onto the outer or forward end of a pull gun and with the mandrel of the pull gun shown extending through the nosepiece;

FIG. 8 is a cross-sectional view taken along the line 8—8 of FIG. 7 illustrating the cylindrical designs of the extension piece, the sleeve retainer, and the mandrel;

FIG. 9 is a cross-sectional view taken along the line 9—9 of FIG. 7 illustrating the arrangement of the alternate splits and fingers of the sleeve retainer;

FIG. 10 is a cross-sectional view taken along the line 10—10 of FIG. 7 illustrates the convergence of the distal ends of the fingers against the mandrel;

FIG. 16 is a schematic view of a less desirable method of manufacturing the nosepiece;

FIG. 17 is a schematic view illustrating the parts of the nosepiece machined away during manufacturing;

FIG. 18 is an isometric view of an alternative embodiment of a tubular bushing-retainer piece for use with the extension piece and the adapter of FIG. 1, with a quarter section removed, to illustrate the design of the tubular bushingretainer piece;

FIG. 19 is a view like FIG. 18 but looking toward the opposite side and the inner end of the bushing-retainer;

FIG. 20 is a sectional view of the bushing-retainer of FIG. 18 mounted onto a nosepiece, with the nosepiece mounted onto a pull gun, and shown with a mandrel having a tubular bushing mounted thereon being inserted into a hole in a workpiece; FIG. 21 is a view similar to FIG. 20 showing the mandrel being retracted through the hole and through the tubular bushing to mount the tubular bushing in the hole and to coldwork the area around the hole;

FIG. 22 is a side elevational view of an offset pullgun, or mandrel puller, equipped with a sleeve retainer constructed in accordance with the present invention; and FIG. 23 is an enlarged scale vertical sectional view of the sleeve retainer and a mounting member to which the sleeve retainer is connected.

BEST MODE FOR CARRYING OUT THE INVENTION

Figure 3:
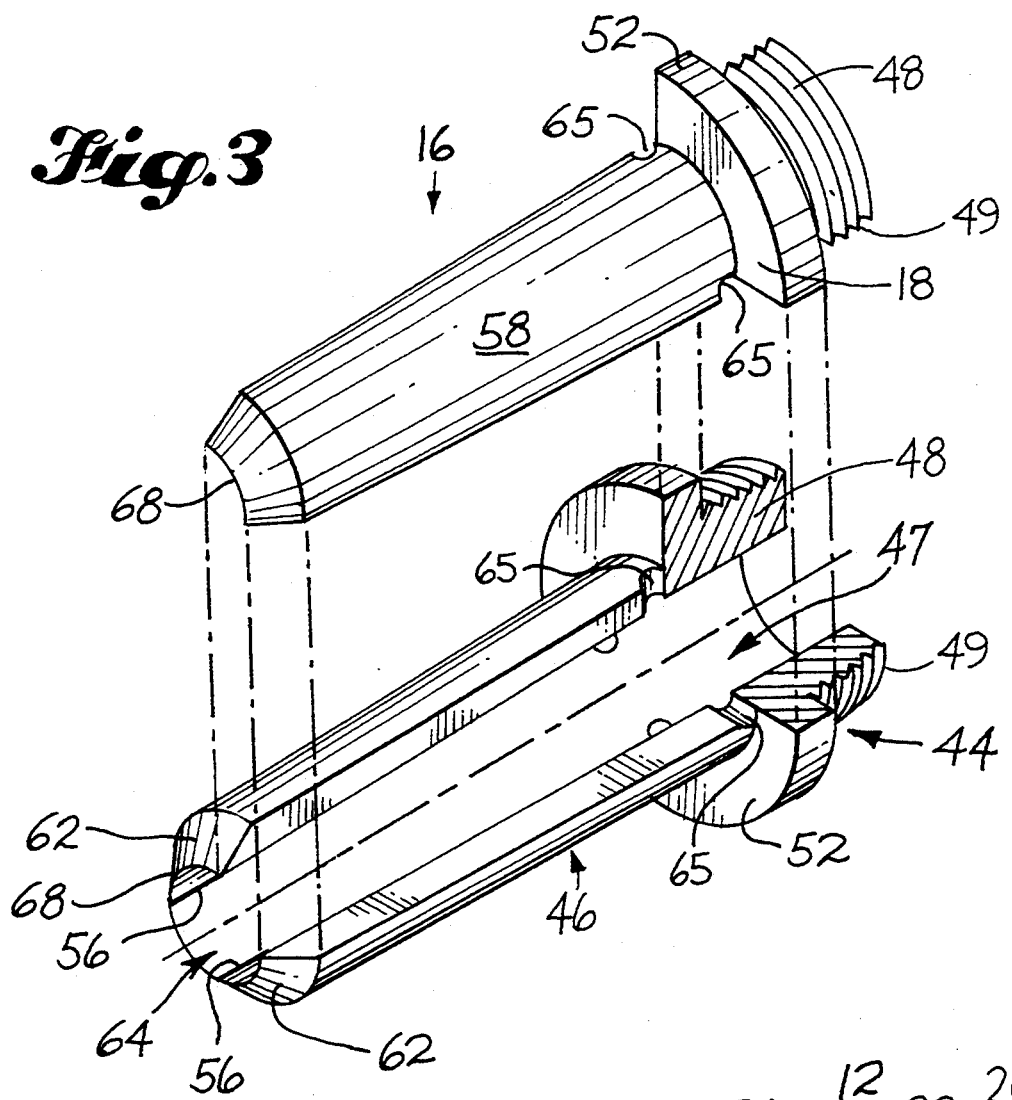
FIG. 3 is an isometric view of the sleeve-retainer piece of the nosepiece of FIG. 1 with a quarter section exploded to illustrate the interior of the sleeve-retainer.

Referring more specifically to the drawings, and to FIGS. 1 and 2 in particular, the nosepiece 10 comprises an adapter 12, an extension 14, and a sleeve retainer 16. The adapter 12 is a generally cylindrical piece with a conical, radial forward end portion 18 and a central passageway 19 therethrough. The rear end portion 20 has a large, threaded passageway 22. Immediately inwardly of the large, threaded passageway 22 is a smaller diameter, non-threaded passageway 24. A still smaller, threaded passageway 26 extends out through the conical forward end 18 of the adapter 12. The threaded passageway 26 includes forward end threads 27. The tapered portion of the conical forward end 18 terminates at a radial end wall 28. The adapter 12, alternatively, could be formed from the forward end portion of a pull gun to include forward end threads 27 of a threaded passageway 26.

The extension 14 is an elongated, tubular member with a central passageway 32 therethrough. The extension 14 includes a rear end portion 34 and a front end portion 36. The rear end portion 34 includes an externally-threaded nipple 38. A radial shoulder 37 is formed at the intersection of the threaded nipple 38 and the main body of the extension 14. The threaded nipple 38 is adapted to couple threadably with the forward end threads 27 of the threaded central passageway 26 of the adapter 12. When coupled together, the radial shoulder 37 of the extension 14 pressure engages the radial end wall 28 of the adapter 12 to mount securely the extension 14 to the adapter 12. The front end portion 36 of the extension 14 includes an internally-threaded passageway 40 including front end threads 41. The front end portion 36 also includes a radial end wall 42 that engages the sleeve retainer 16.

The sleeve retainer 16 includes a rearward end portion 44 and a forward end portion 46. The rearward end portion 44 is a generally tubular piece having a central passageway 47 therethrough. The rearward end portion 44 includes an externally threaded nipple 48, having rearward threads 49, and an annular radial flange 52 adjacent the threaded nipple 48. The radial flange 52 has a radial shoulder 54. The threaded nipple 48 of the rearward end portion 44 is adapted to couple threadably with the threaded passageway 40 at the front end portion 36 of the extension 14. When the rearward end of the sleeve retainer is connected to the extension, the radial shoulder 54 of the flange 52 pressure engages the radial end wall 42 of the extension 14.

The forward end portion 46 of the sleeve retainer 16 is formed by a multiple of circumferentially-spaced alternate splits 56 and fingers 58, which extend substantially axially from the flange 52 and, in preferred form, converge radially inwardly along their length toward their outer distal ends 62. The retainer 16 is best illustrated in FIG. 3, wherein one of the fingers 58 and a corresponding portion of the rearward end portion 44 of the retainer 16 are shown exploded to illustrate the design of the fingers 58. In a preferred embodiment, there are four fingers 58 that extend axially outwardly from the flange 52. The fingers 58 are concave, quarter-circle, elongated segments that together form a cylindrical central passageway 64, which is aligned axially with the central passageway 47 of rearward end portion 44 of the retainer. At the radial flange 52, the fingers 58 are slightly spaced angularly from each other to form the splits 56 between the fingers. At the radial flange 52, the splits between the fingers 58 intersect radial circular openings 65. The fingers 58 flex at the flange 52 and function as leaf springs, as is discussed later.

Axially outwardly from the radial flange 52, the fingers 58 in the preferred embodiment converge radially about the passageway 64 so that, at their outer ends 62, the fingers 58 substantially contact each other. Due to the convergence of the fingers 58 toward their outer ends 62, the splits 56 converge into slits 56, and the passageway 64 narrows in diameter. At the outer ends 62 of the fingers 58, the outer surfaces of the outer ends 62 of the fingers 58 are beveled to form conical surface segments. The conical surface segments 62 taper into an annular rim 68 formed by the outermost edges of the four fingers. The conical surface segments 62 function to hold the split sleeve within the fastener hole.

The sleeve retainer 16 is made from high strength tool steel, preferably H-13, and in the unhardened state, the splits 56 are cut in the retainer 16 so that the fingers 58 have generally axially-directed parallel sides. This intermediate step for forming the retainer sleeve 16 is not shown. The retainer sleeve 16 is heat treated in order to form the converging axially-directed fingers 58. In preparation for heat treating, an annular clamping device, such as a ring, is positioned around the outer circumference of the fingers adjacent their outer distal ends 62 so as to cause the fingers 58 to angle radially inwardly and the splits adjacent the outer end to narrow into slits. The openings 65 at the rearward end of the fingers 58 cause the fingers to bend at the flange 52. The retainer is then heat treated and quenched so that when the clamping device is removed, the retainer remains in the form as clamped, and as shown. The fingers 58 are in the form of hardened springs, bias radially inwardly, and adapted to fit tightly on all portions of the mandrel, discussed later, which passes through the smaller diameter passageway 64 formed by the fingers.

Figure 4:
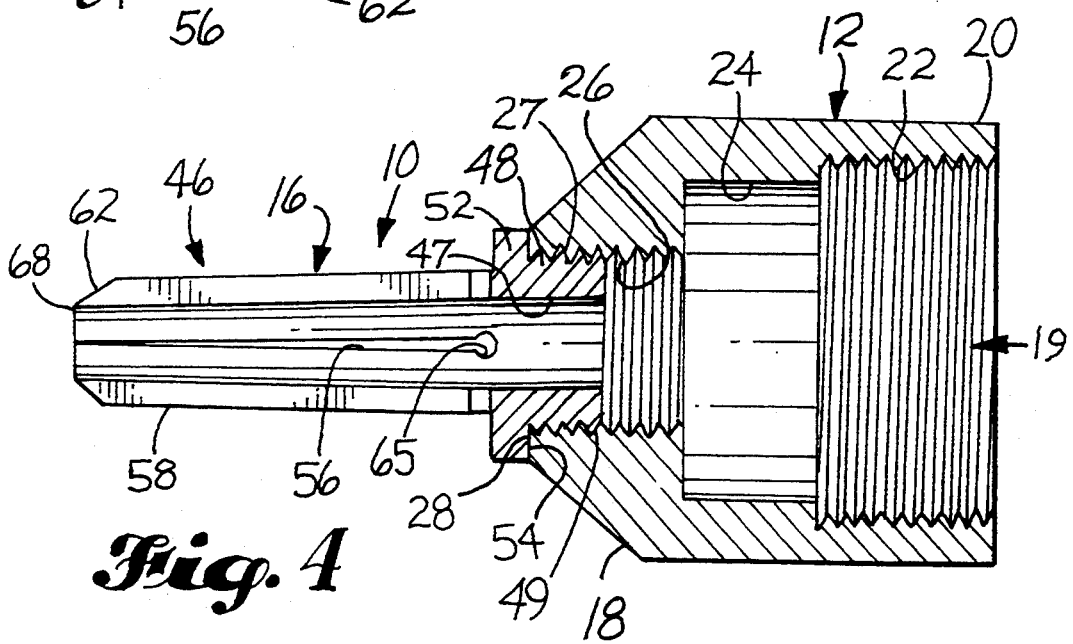
FIG. 4 is a longitudinal sectional view of the nosepiece of FIGS. 1-3 without the extension piece, the sleeve-retainer being directly mounted to an adapter.

FIG. 4 is a longitudinal view of the nosepiece 10 shown with the sleeve retainer 16 directly mounted to the adapter 12. The threaded nipple 48 of the sleeve retainer 16 couples directly into the threaded passageway 26 of the forward end portion 18 of the adapter 12. In this configuration, the radial shoulder 54 of the retainer 16 pressure engages the radial end wall 28 of the adapter 12.

FIGS. 5 and 6 further illustrate the tubular design of the nosepiece 10 and the design of the mandrel 80. The mandrel 80 has an rear end 82 and an enlarged front end 84. The rear end 82 of the mandrel is mounted to a threaded shank 86 that is coupled to a mandrel mount 98 (FIG. 7) that is part of an air/hydraulic pull gun that is utilized in conjunction with the nosepiece in the coldworking process. A preferred pull gun is disclosed by U.S. Pat. No. 4,187,708, granted Feb. 12, 1980, to Louis A. Champoux.

Illustrated in FIGS. 5 and 6 is a three-piece nosepiece that includes the adapter 12, the extension 14, and the sleeve retainer 16. The passageway 64 and the central passageway 47 in the sleeve retainer 16 align with the central passageway 32 of the extension 14 when the retainer 16 is mounted onto the extension 14. Likewise, the central passageway 32 of the extension 14 aligns with the central passageway 19 of the adapter 12 when the extension 14 is mounted onto the adapter 12. The mandrel 80 is adapted to reciprocate through the passageways 47, 32, 19 formed in the three sections of the nosepiece 10.

Extending outwardly of its rear end 82, the mandrel 80 has a small diameter, elongated cylindrical portion 88 on which the outer ends 62 of the retainer fingers 58 normally are tightly but slidably engaged. Outwardly of the small diameter portion 88 is an increasing diameter conical portion 90 (termed "back side taper"), terminating in a maximum diameter cylindrical portion 92. Tapering outwardly from the maximum diameter cylindrical portion 92 is a decreasing diameter frusto-conical end portion 94 (termed "front side taper").

FIG. 7 is a longitudinal sectional view of the nosepiece 10 shown with the mandrel 80 inserted therethrough. The threaded shank 86 at the rear end of the mandrel 80 is mounted threadably to a mandrel mount 98 that attaches to the piston in the piston/cylinder chamber of the pull gun 100. The internally-threaded rear end 20 of the adapter 12 threadably couples to the forward end of the pull gun 100. Replacement of a mandrel is accomplished by removing the nosepiece 10 and unthreading the mandrel 80 from the mount 98.

The extension piece 14 is mounted threadably to the adapter 12, and the sleeve retainer 16 is coupled threadably to the extension 14. The outer ends 62 of the retainer fingers 58 slidably engage the circumference of the elongated small diameter portion 88 of the mandrel 80. The mandrel 80 is inserted through the nosepiece 10 in the direction indicated by arrow 106. When the forward end 84 of the mandrel moves through the sleeve retainer 16, the forward end 84 closely slides through the central passageway 47 of the sleeve retainer 16, and slidably engages the leaf spring fingers 58, thereby prying the fingers radially outwardly in the manner of a set of opening jaws.

FIG. 8 is a cross-sectional view taken along the line 8—8 of FIG. 7. FIG. 8 illustrates the tubular design of the extension 14 and the rearward end portion 44 of the sleeve retainer, and the small diameter portion 88 of the mandrel. FIG. 9 is a cross-sectional view taken along the line 9—9 of FIG. 7, and illustrates the cylindrical passageway 64 formed by the fingers 58 of the sleeve retainer. At this position along the fingers 58, the fingers 58 are spaced from the small diameter portion 88 of the mandrel. In FIG. 10, the outer ends 62 of the fingers converge toward each other and toward the mandrel 88 to a point where the edges of the fingers contact one another, forming slits 56.

Figure 11:
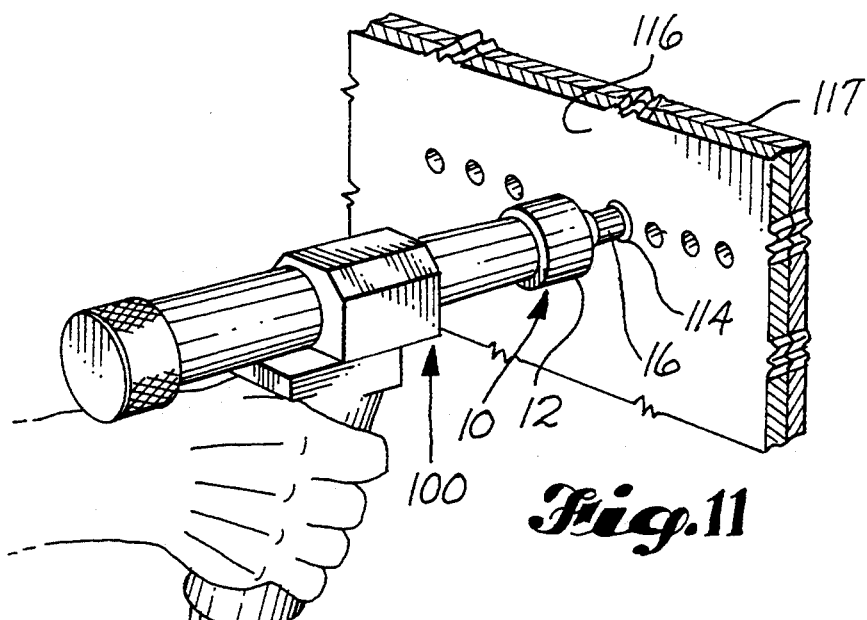
FIG. 11 is an isometric view of the nosepiece of FIGS. 1-10 mounted onto a pull gun and being used without an extension to coldwork a hole in a workpiece.

FIG. 11 illustrates a pull gun 100 which may be of the type disclosed in the aforementioned U.S. Pat. No. 4,187,708. As shown in FIG. 11, the nosepiece 10 includes only the adapter 12 and sleeve retainer 16, with the sleeve retainer 16 mounted directly to the adapter. The pull gun 100 operates hydraulically to retract the mandrel through a fastener hole 114 in a workpiece 116, 117. Workpieces 116, 117 illustrate two sheets of aluminum that may comprise portions of the wings or fuselage of a commercial aircraft.

Figure 12:
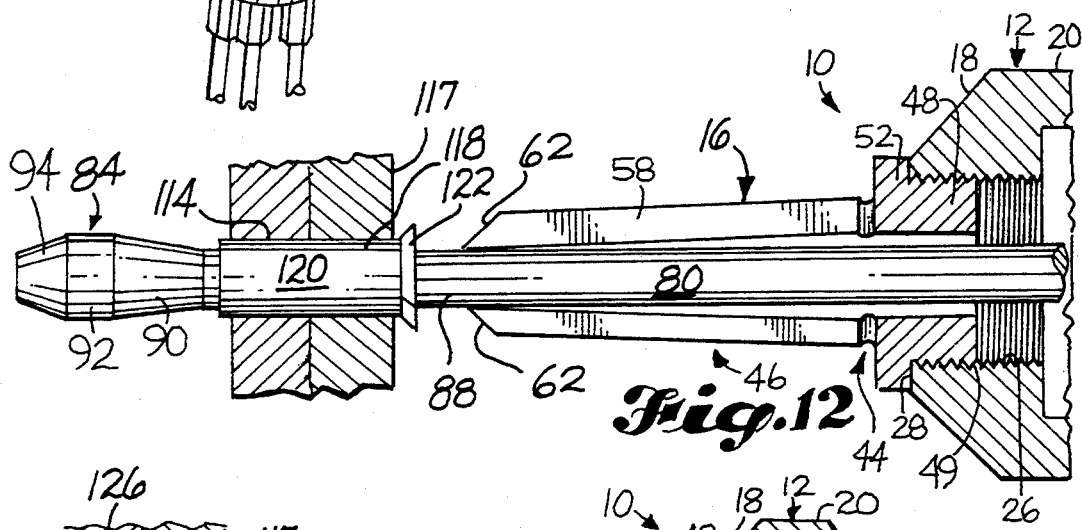
FIGS. 12 and 13 are a sequence of longitudinal sectional views illustrating the operation of the nosepiece in a coldworking process.
Figure 13:
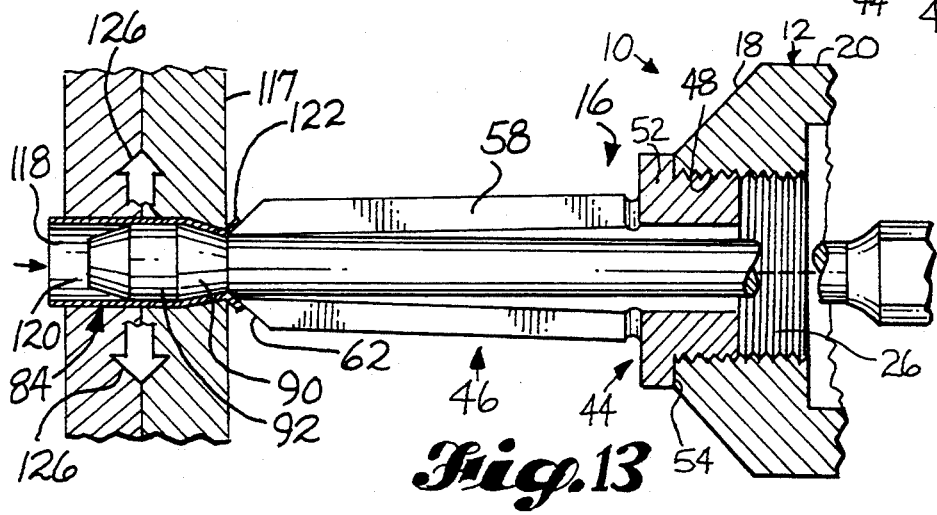

FIGS. 12 and 13 illustrate the operation of the pull gun of FIG. 11 with the nosepiece 10 mounted thereon. The nosepiece 10 does not include the extension piece. In FIG. 12, a split sleeve 118 is utilized in the coldworking process. My aforementioned U.S. Pat. No. 4,471,643 discloses in more detail the design of the split sleeve 118, as well as the coldworking operation. Generally, the split sleeve 118 is a tubular sleeve having an axial split 120 therethrough. The inner end of the split sleeve 118 has a flared surface 122 through which the axial split 120 also extends.

The split sleeve 118 preferably has a comparable or a higher compressive yield than the tensile yield of the material of the workpiece. The interior surface of the split sleeve has a solid film lubricant applied thereto of a commercial type that includes graphite, molybdenum disulfide. The lubricant film is capable of withstanding more than 400,000 psi. U.S. Pat. No. 3,566,662, entitled, "Coldworking Method and Apparatus," issued Mar. 2, 1971, and U.S. Pat. No. 3,665,744, entitled, "Method and Apparatus for Making Sleeves," issued May 30, 1972, describe in more detail the split sleeves and a manner of constructing them.

In operation, the pull gun (FIG. 7) is operated to extend the mandrel through the nosepiece so that the headed end of the mandrel extends forwardly or outwardly beyond the forward or outer ends of the fingers of the sleeve retainer. The split sleeve is then mounted onto the small diameter portion of the mandrel and slid along the mandrel until the flared end of the sleeve abuts the fingers of the sleeve retainer. The headed end of the mandrel is inserted manually through the fastener hole until the split sleeve is inserted into the fastener hole. In FIG. 12, the mandrel 80 is in its fully-extended position relative to the pull gun and has been moved through the aligned holes 114 of the workpiece 116, 117 with the split sleeve 118 mounted on the mandrel 80. The diameter of the small diameter portion 88 of the mandrel 80, plus the thickness of the split sleeve 118 is approximately equal to the diameter of the fastener hole 114. The diameter of the headed end 84, likewise, is approximately equal to the diameter of the fastener hole 114. The outer ends 62 of the fingers hold the split sleeve 118 within the fastener hole 114.

As shown in FIG. 13, the mandrel 80 is then retracted back into the pull gun. As the increasing diameter portion 90 and the maximum diameter portion 92 of the head 84 retract through the fastener hole 114, the split sleeve 118 expands. The area around the fastener hole 114 is yielded, as indicated by the arrows 126, and tensioned circumferentially about the fastener hole 114. This represents the cold expansion of the sleeve portion in the hole 114. As the head of the mandrel 80 is pulled through the fastener hole 114, the retainer sleeve 118 is held within the fastener hole by the engagement of the conical surface segments 62 and outer ends 62 of the fingers 58 of the retainer 16. The retainer fingers 58 ensure that the split sleeve 118 does not move in the axial direction of the mandrel, which movement can cause shearing within the fastener hole.

As the split sleeve 118 expands, the axial split 120 separates and forms a noticeable gap. It has been discovered that the area of the workpieces 116, 117 immediately adjacent this small gap 120 receive little or no radial compression forces. This leaves a small bead along the interior surface of the fastener holes 114. However, it has been found that this bead is yielded in tension, and, thus, increases the fatigue life of the workpiece.

A considerable pulling force is required to pull the increasing larger diameter portions of the head of the mandrel through the split sleeve and fastener hole. As the increasing diameter portion of the mandrel starts to expand the split sleeve in the fastener hole, a holding force is exerted on the flared end 122 of the split sleeve by the conical surface segments and outer ends of the retainer fingers 58. At this time, the retainer fingers exert a considerable force against the flared end 122 of the split sleeve. As a result, the flared end 122 of the split sleeve 118 axially compresses the edge of the fastener hole 114 of workpiece 117. This not only enhances the fatigue life of the workpiece, but also enhances the appearance of the fastener hole. When the head of the mandrel is completely withdrawn from the fastener hole, the prestressing of the fastener hole is completed.

Figure 14:
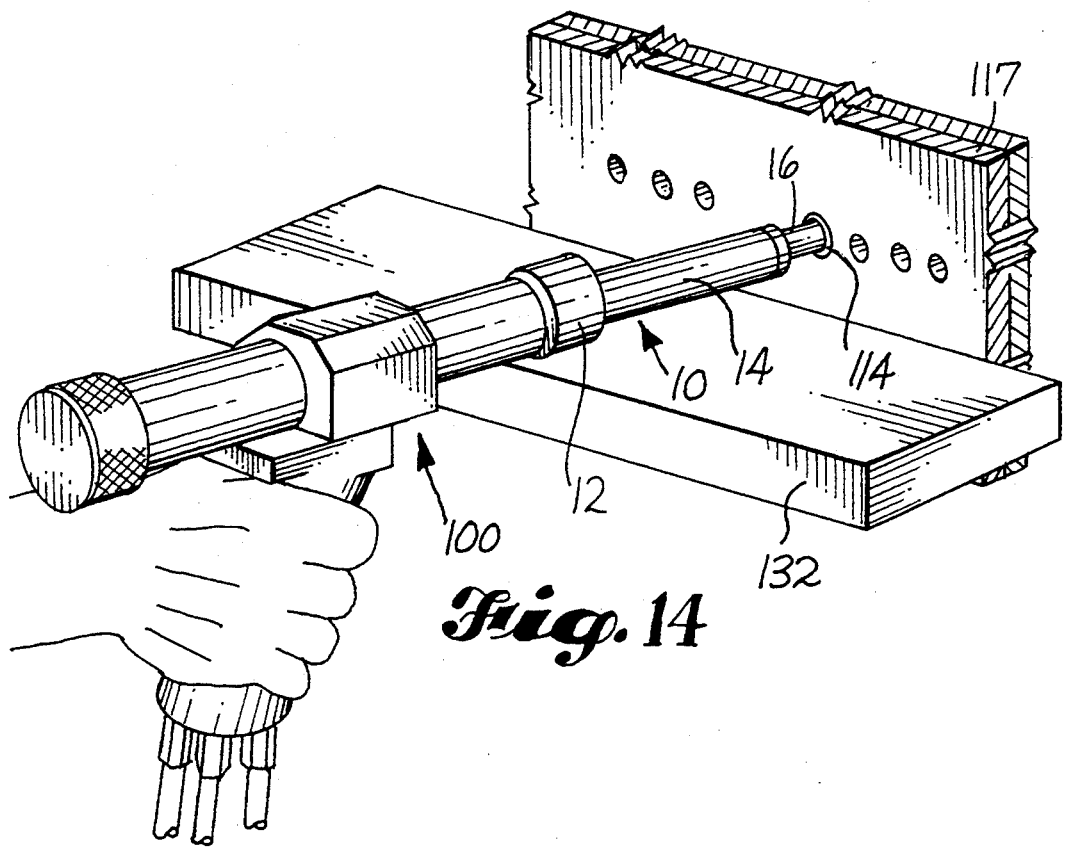
FIG. 14 is an isometric view of the nosepiece of FIG. 1 mounted onto a pull gun and being used with an extension to coldwork a workpiece where an obstacle is immediately adjacent the holes in the workpiece.

FIG. 14 illustrates an advantage of the present invention over prior art nosepieces. The extension 14 of the nosepiece 10 can be manufactured in many different lengths so that it is possible to position the pull gun 100 at different distances from the workpiece 116, 117. Spacing of the pull gun 100 is required when, for example, an obstacle 132, such as a board or structural member, is positioned adjacent the fastener holes 114. The greater the size of the obstacle, a longer extension 14 is used to space the pull gun 100 from the workpiece.

Figure 15:
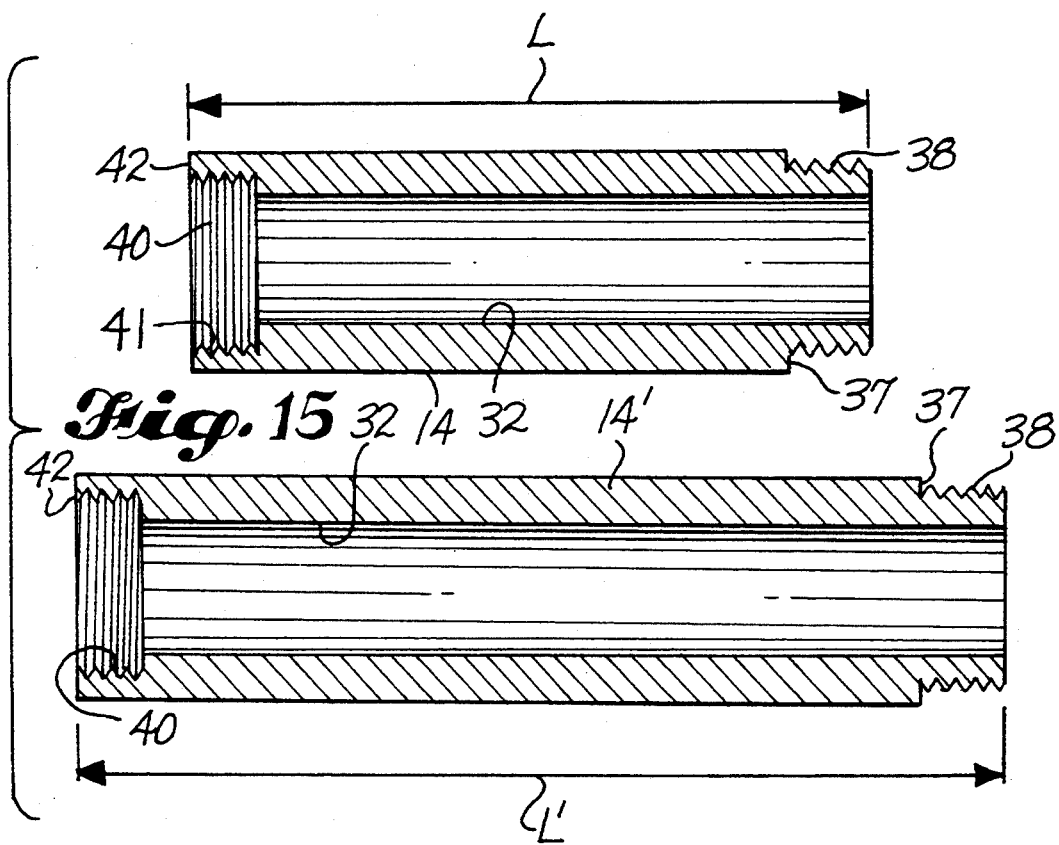
FIG. 15 is a side-by-side view of two interchangeable extensions of different length, both shown in longitudinal section.

FIG. 15 illustrates a pair of extension pieces 14, 14' of varying lengths. Extension 14 has a length L, while extension 14' has length L'. Regardless of the length of the extensions, the forward threaded passageways 40, the threaded nipples 38, and radial end walls 37, 42 are of the same dimensions. It is necessary, however, that the mandrel be of sufficient length to extend through the nosepiece a minimum distance to allow placing of the split sleeve onto the small diameter portion of the mandrel. Accordingly, for some applications, mandrels of varying lengths are required (as shown in FIGS. 7 and 12), in order for the mandrel to be of sufficient length to extend through longer extension pieces. Thus, for these applications, a worker would be supplied with, among other things, a pull gun, an adapter, a sleeve retainer, a supply of different length extension pieces, a supply of different length mandrels, and a supply of sleeve retainers.

It should also be noted that the present invention is well suited for cold working fastener holes with a large "stack-up" thickness. The "stack-up" thickness is the depth of the fastener hole. For some applications, increased stack-up thicknesses are encountered where several parts, or large parts, are attached. To cold work such deep fastener holes, a long mandrel is used in conjunction with a short extension piece. This allows a significant portion of the mandrel to protrude from the sleeve retainer and be inserted through the deep fastener hole.

A worker can quickly and efficiently coldwork a multiplicity of fastener holes, or the like, by having a supply of varying length extension pieces and varying length mandrels at hand, and installing the appropriate length extension and mandrel as part of the nosepiece and pull gun assembly according to the size of the obstacle adjacent the fastener hole. If no obstacle is present, the sleeve retainer can be mounted directly to the adapter and a shorter length mandrel.

The modular construction of the nosepiece provides a number of advantages over constructing a nosepiece from a single piece of metal. The slotted sleeve retainer has to be heat treated to provide it with high strength and hardness. Specifically, the yield strength of the fingers must be sufficiently high so that the fingers do not fail under column loading during coldworking. The fingers also must be hard to provide them with an extended wear life. If the nosepiece is made in a single piece, such as the nosepiece disclosed in FIG. 8 of U.S. Pat. No. 4,471,643, the entire finished nosepiece must be heat treated to the needs of the forward end section of the sleeve retainer. Not only is it undesirable to heat treat the entire nosepiece, it also is not desirable to heat treat the threads at the rear end of the adapter. Further, if the nosepiece is constructed in one piece, as shown in FIG. 16, it must be fashioned from a block of metal or rod stock, indicated by reference 133, that has a starting diameter equal to the diameter of the largest section of the nosepiece, i.e. the adapter 12 at the rear end 20 of the nosepiece. Accordingly, much machining is required to remove the material indicated by reference 134, and there is a considerable amount of waste.

The modular construction of the nosepiece allows the adapter at the rear end of the nosepiece to be made from stock tubular material that is not heat treated. By way of example, it can be made from ETD150, which has a minimum Rockwell hardness of 32. The adapter can be a tubular member that comes with the desired strength and is then machined. There is relatively little material waste due to machining and the threads can be made without heat treating. As shown in FIG. 17, the large, threaded passageway 22 is machined, as is the smaller diameter non-threaded passageway 24, to remove material indicated by dashed line 136. The forward end portion 18 is machined to form a taper, thereby removing material indicated by dashed line 137.

The extension pieces can be made from tubular stock material, such as 4000 series tubing, which is heat treated when made to an adequate strength. This tubular stock material requires very little material removal. It can be designed for strength and desired thread characteristics without much concern for wear. The threaded nipple 38 is machined to remove material represented by dashed lines 139, and the front end threads 41 are machined to remove material represented by dashed line 141.

The forward end section 46 of the sleeve-retainer piece 16 is constructed from a short length of tubular metal stock material. It must be machined to form the nipple 48 at its rearward end and the fingers 58 at its forward end. Machining removes the material indicated by dashed lines 143, 145. After machining, the sleeve retainer 16 must be heat treated to provide the desired yield strength and hardness. It is the only section of the nosepiece that has to be heat treated after machining.

The section from which the fingers are formed initially has a uniform inside diameter. The fingers are heat treated to make them converge and grip the mandrel at their forward end. Specifically, following the heat treat process, the mandrel passageway within the rearward end portion of the sleeve retainer is cylindrical. Extending forwardly, this passageway tapers slightly as it extends to the forward end of the sleeve retainer. In this tapered region, the mandrel passageway is conical but the degree of taper is quite small and is accurately pictured by the drawing figures. This taper produces an edge 63 at the forward end of the passageway where contact is made with the mandrel (FIG. 1). This construction has resulted in an increased static strength of the fingers and the sleeve-retainer piece. That is, the column strength is stronger, which allows the slits and fingers to be longer. The fingers act as springs and making them longer lessens the stiffness and makes them easier to bend. Owing to the initially straight center opening, the increased flexibility is obtained without a sacrifice in strength. The fingers 58 are both flexible enough to allow the mandrel to slide through the sleeve retainer 16 rather easily, while the fingers 58 are capable of withstanding the relatively high order column loading experienced by them during use.

The front end of the extension nosepiece disclosed by U.S. Pat. No. 4,471,643 includes a reduced diameter inner end portion. Rearwardly of this end portion, the internal diameter of the nosepiece increases. The material at the front end, which extends radially inwardly from the increased diameter region of the nosepiece to provide the reduced diameter, is a short cantilever beam. The presence of this cantilever beam adds a moment to the force system that is significant. Elimination of this material in the present invention, by use of the straight-through hole, reduces the moment and provides a result that is very significant because the loading on the fingers is essentially an axial load.

In FIGS. 18 and 19, an alternative embodiment of the present invention is illustrated. A tubular bushing-retainer piece 216 is shown to include a central passageway 217, a flange 222, a threaded rearward end portion or nipple 220, and a forward end portion 218 in the form of an annular projection. The junction of the flange 222 and the threaded nipple 220 of the rearward end portion form a shoulder 224. Shoulder 224 is adapted to pressure engage the radial end wall of either an extension piece or an adapter, in a manner similar to the sleeve-retainer piece 16 of the first embodiment. The annular projection 218 is flush with the central passageway 217 of the bushing-retainer piece 216. The annular projection 218 defines a radial end wall 219 of flange 222.

FIG. 20 shows the bushing-retainer 216 mounted onto an extension piece 14, which in turn is mounted to an adapter 12. The adapter 12 is mounted onto the forward end of a pull gun 100. The bushing-retainer 216 is shown with its radial end wall 219 abutting against the workpiece 117. The annular projection 218 extends into the hole 114 of the workpiece 117. A tubular bushing 226 is mounted onto a mandrel 280. The mandrel 280 extends through the hole 114 in the workpiece, with its enlarged head 284 extending through to the other side of the workpiece 117. Mandrel 280 has an inner end 282 that is different from the inner end 82 of the mandrel 80 of FIG. 5. The inner end 282 of mandrel 280 is smaller in diameter than the central portion of the mandrel 280 and includes a grooved recess 286. The inner end 282 of the mandrel 280 is adapted to couple to a mandrel mount 290 that is in the form of a quick release chuck assembly. The quick release chuck assembly 290 mounts onto the forward end of the piston rod 292 within the pull gun 100. The mandrel mount 290 includes a tubular housing 294. The outer ends of the housing 294 taper inwardly at 295. A chuck adapter 296 threadably mounts the housing 294 to the piston rod 292. A compression spring 298 is held between the chuck adapter 296 and a jaw follower 300. A set of jaws 302 are loosely held between the jaw follower 300 and a jaw release 304. Preferably there are three jaws 302 that are positioned circumferentially about the passageway of the chuck assembly. The jaws 302 are movable between an open position, as shown in FIG. 20, to a closed position. Jaw release 304 is a tubular member having an outer ring 306 adapted to abut against a washer 308 held within the passageway 24 of the adapter 12. An inner retainer ring 310 is mounted to an outer retainer ring 312 that is formed integral with the housing 294. Quick release chuck assembly 290 is a conventional item known in the art for providing a quick release mount for the mandrel 280.

Because tubular bushings 226 are not split longitudinally, as are split sleeves, it is necessary for the mandrel 280 to be easily released from the mandrel mount 290 so that the tubular bushing 226 can be slid over the inner end 282 of the mandrel 280. It is not practical to slide the tubular bushing 226 over the enlarged head 284 of the mandrel 280. The quick release chuck assembly 290 allows a worker to release the mandrel 280 from the mandrel mount 290 and mount a tubular bushing 226 onto the mandrel, all in a relatively quick and simple operation.

FIG. 20 shows the tubular bushing 226 mounted onto the mandrel 280 and the mandrel 280 inserted into a hole 114 in a workpiece 117. To accomplish this, a worker fully extends the piston rod 292 of the pull gun 100 so that the mandrel mount 290 moves toward the washer 308 in the adapter 12. The outer ring 306 of the jaw release 304 engages the washer 308, which slides the jaw release 304 longitudinally inwardly toward the compression spring 298. The inner ends of the jaw release 304 push against the jaws 302. In turn the jaws 302 push against the jaw follower 300, and the jaw follower 300 compresses the spring 298. As the jaw release 304 and jaw follower 300 slide the jaws 302 longitudinally into the pull gun, the jaws 302 move radially outwardly. This increases the size of the opening formed by the jaws 302, and allows the inner end 282 of the mandrel 280 to move all the way into the mandrel mount 290, so that the grooved recess 286 of the mandrel aligns with the jaws 302.

As shown in FIG. 21, the piston rod 292 is retracted inwardly, as indicated by arrow 316. Compression spring 298 forces the jaw follower 300 and the jaws 302 and the jaw release 304 outwardly from the housing 294. This causes the jaw release 304 to slide outwardly relative to the mandrel mount 290, as the mandrel mount 290 moves away from the washer 308. As the jaw release 304 moves longitudinally relative to the mandrel mount 290, the jaws 302 and the jaw follower 300 are allowed to slide outwardly relative to the housing 294 of the mandrel mount 290. This causes the jaws 302 to slide radially inwardly as well toward the grooved recess 286 of the inner end 282 of the mandrel 280° As the jaws 302 move into the grooved recess 286, they clamp down on the mandrel. The inner end of the mandrel 280 is clamped by the jaws 302 just prior to the enlarged head 284 of the mandrel being retracted through the tubular bushing 226.

As the enlarged head 284 of the mandrel 280 retracts through the tubular bushing 226, the tubular bushing is radially expanded. This expansion mounts the tubular bushing 226 within the hole 114 of the workpiece 117 in an interference fit. It also coldworks the area of the workpiece 117 around the hole 114. The annular projection 218 of the bushing-retainer piece 216 holds the tubular bushing 226 within the hole 114 of the workpiece 117. The annular projection 218 also keeps the tubular bushing 226 recessed within the hole 114, which sometimes is desirable.

As with the nosepiece assembly of the first embodiment, the nosepiece shown in FIGS. 18–21 can be utilized with or without an extension piece 14 mounted between the bushing-retainer 216 and the adapter 12. In addition, a plurality of extension pieces 14 can be provided, as shown in FIG. 15, for adjusting the length of the nosepiece assembly. Further, a plurality of mandrels of different lengths can be provided, each one corresponding to an extension piece of a certain length. FIG. 22 is a side elevational view of an offset pullgun or mandrel puller 350. FIG. 23 is an enlarged scale sectional view of the sleeve retainer 16 connected to a mounting member 352 which, in turn, is removably connected to an upper forward portion of the mandrel puller 350. Member 352 has a pair of locator pins 354, only one of which is shown in FIG. 23. This is because the second locator pin is located behind locator pin 354. Member 352 also includes a lap recess 356 and a threaded opening 358 which receives the threaded rear end portion 49 of the sleeve retainer 16. The sleeve retainer 16 is connected to the member 352 either before or after the member 352 is secured to the body of the mandrel puller 350. Member 352 is mounted by placing the locator pins 354 within openings in the forward wall of the housing. Then, a retainer member 358 is positioned on the housing below member 352. It includes a lap portion 360 which overlaps lap portion 356, as shown in FIG. 22. Then, fastener screws 362 are installed to secure member 358 to the housing of the mandrel puller. When installed, member 358 holds member 352 against the forward end of the housing. The locator pins 354 and the openings in which they are situated prevent sideways and up and down sliding movement of member 352.

The offset mandrel puller 350 is very well known and is, per se, not a part of the present invention. As is known, member 364 is extended and retracted by the piston cylinder unit so that it travels forwardly and rearwardly as indicated by arrow 366. The rear end of the mandrel 368 is connected to member 364. The mandrel 368 extends forwardly from member 364, through the sleeve retainer 16. The relationship of the mandrel and the sleeve retainer is essentially as shown in FIG. 7, except that the mandrel is much shorter.

The internal straight taper mandrel passageway is an important feature and may be used with other types of rear end connectors on the sleeve-retainer piece. Also, the rear end connector may be of a snap-on type or may be a bayonet-type connector.

It is to be understood that many variations in size, shape, and construction can be made to the illustrated and above-described embodiment without departing from the spirit and scope of the present invention. Some of the features of the preferred embodiment may be utilized without other features. Therefore, it is to be understood that the presently described and illustrated embodiment is non-limitive and is for illustration only. Instead, my patent is to be limited for this invention only by the following claim or claims interpreted according to accepted doctrines of claim interpretation, including the doctrine of equivalence and reversal of parts.

What is claimed is:

1. A nosepiece for use in combination with a pull gun for pulling an elongated mandrel, with a split sleeve mounted on it, through a hole in a workpiece in order to expand radially the split sleeve and the workpiece, the nosepiece including:
   a pull gun forward end portion having a central passageway and forward end threads,
   an elongated, tubular extension including a rear end portion having rear end threads adapted to couple threadably with the forward end threads on the pull gun forward end portion and also having a front end portion including front end threads, and
   a tubular, sleeve-retainer piece including a rearward end portion and a forward end portion, the forward end portion formed by a multiple of circumferentially spaced, alternate splits and fingers extending substantially axially forwardly from the rearward end portion,
   the rearward end portion of the tubular sleeve-retainer piece including rearward threads adapted to couple threadably both to the front end threads on the tubular extension and to the forward end threads on the pull gun forward end portion,
   whereby the nosepiece can be utilized without the extension and with the sleeve-retainer piece directly coupled to the pull gun forward end portion, and can be utilized with the extension mounted between the retainer and the pull gun forward end portion.

2. The nosepiece of claim 1, wherein the rearward end portion of the sleeve-retainer piece includes a radial shoulder and both the extension and the forward end portion of the pull gun have a radial end wall adapted to pressure engage the radial shoulder on the sleeve-retainer piece when threadably coupled to the sleeve-retainer piece.

3. The nosepiece of claim 1, wherein the forward end of the sleeve-retainer piece includes a conical surface for fitting into a conical flare at an end of a sleeve, for holding the sleeve within the hole of the workpiece as a mandrel is pulled through the nosepiece.

4. The nosepiece of claim 1, wherein the forward end portion of the pull gun is an adaptor 12 that is removably connectable to the pull gun, the adaptor having a rear end adapted to mount to the pull gun.

5. The nosepiece of claim 4, wherein the rearward end portion of the sleeve-retainer piece includes a radial shoulder 52 and both the extension and the adaptor have a radial end wall adapted to pressure engage the radial shoulder of the sleeve-retainer piece when threadably coupled to the sleeve-retainer piece.

6. The nosepiece of claim 4, wherein the forward end of the sleeve-retainer piece is conical for fitting into a flare at an end of a sleeve, and wherein during use the sleeve flare is clamped between the conical end of the sleeve-retainer piece and an edge of the hole in which the sleeve is located.

7. The nosepiece of claim 1, wherein the forward end portion of the pull gun is an adapter that is removably connectable to the pull gun, the adapter having a rear end adapted to mount to the pull gun.

8. A nosepiece assembly for use in combination with a pull gun for pulling an elongated mandrel, with a split sleeve mounted on it, through a hole in a workpiece, in order to expand radially the split sleeve and the workpiece, the nosepiece assembly including:

a forward end portion of a pull gun having a central passageway and forward end threads, a plurality of elongated tubular extensions of different lengths, but each including a rear end portion having threads adapted to couple threadably with the forward end threads on the forward end portion of the pull gun, and each also including a front end portion having front end threads, and a tubular sleeve-retainer piece including a rearward end portion and a forward end portion, the forward end portion being formed by a multiple of circumferentially spaced, alternate splits and fingers extending substantially axially forwardly from the rearward end portion, the rearward end portion of the sleeve-retainer piece having rearward threads adapted to couple threadably to the front end threads of each elongated, tubular extension and to the forward end threads of the pull gun forward end portion, whereby the nosepiece can be utilized without an extension and with the sleeve-retainer piece directly coupled to the forward end portion of the pull gun, and can also be used with a selected one of the plurality of elongated extensions mounted between the sleeve-retainer piece and the forward end portion of the pull gun.

9. The nosepiece assembly of claim 8, wherein the alternate fingers of the sleeve-retainer converge radially inwardly along their length from the inner end portion of the sleeve-retainer piece.

10. The nosepiece of claim 8, wherein the outer end threads of the sleeve-retainer piece includes a radial shoulder and each extension and the forward end portion of the pull gun each have a radial end wall adapted to pressure engage the radial shoulder of the sleeve-retainer piece when threadably coupled to the sleeve-retainer piece.

11. The nosepiece of claim 8, wherein the forward end of the sleeve-retainer piece includes a conical surface for fitting into a flare on a sleeve for holding the sleeve within the hole of the workpiece as the mandrel is pulled through the nosepiece assembly.

12. The nosepiece of claim 8, wherein the forward end portion of the pull gun is an adaptor that is removably connectable to the pull gun, the adaptor having a rear end adapted to mount to the pull gun.

13. The nosepiece of claim 12, wherein the rearward end portion of the sleeve-retainer piece includes a radial shoulder and both the extension and the adaptor have a radial end wall adapted to pressure engage the radial shoulder of the sleeve-retainer piece when threadably coupled to the sleeve-retainer piece.

14. The nosepiece of claim 13, wherein the forward end of the sleeve-retainer piece includes a conical surface for fitting into a flare at an end of a sleeve, and wherein during use the sleeve flare is clamped between the conical end of the sleeve-retainer piece and an edge of the hole in which the sleeve is located.

15. In combination:
a pull gun including a forward end portion having a central passageway and forward end threads,
a mandrel mount within the pull gun,
an elongated, tubular extension having a rear end portion with rear end threads adapted to couple threadably with the forward end portion of the pull gun and also having a front end portion including front end threads, a tubular sleeve-retainer piece including a rearward end portion and a forward end portion, the forward end portion being formed by a multiple of circumferentially spaced alternate splits and fingers extending substantially axially forwardly from the rearward end portion, the rearward end portion of the tubular sleeve-retainer piece including rearward threads adapted to couple threadably both to the front end threads on the tubular extension and to the forward end threads on the pull gun forward end portion, and a plurality of mandrels, each mandrel having a rear end portion and a sleeve expanding front end portion, the rear end portion being connectable to the mandrel mount within the pull gun, whereby the nosepiece assembly can be utilized without the extension and with the sleeve-retainer piece directly coupled to the forward end portion of the pull gun, and with a first the mandrel connected to the mandrel mount and extending forwardly from the pull gun through the tubular sleeve-retainer piece, and can also be utilized with the extension mounted between the sleeve-retainer piece and the forward end portion of the pull gun, and with a second longer mandrel being connected at its rear end to the mandrel mount in the pull gun and extending forwardly from the pull gun through both the extension and the tubular sleeve-retainer piece.

16. The nosepiece of claim 15, wherein the rearward end portion of the sleeve-retainer piece includes a radial shoulder and both the extension and the forward end portion of the pull gun have a radial end wall adapted to pressure engage the radial shoulder on the sleeve-retainer piece when threadably Coupled to the sleeve-retainer piece.

17. The nosepiece of claim 15, wherein the forward end of the sleeve-retainer piece includes a conical surface for fitting into a conical flare at an end of a sleeve, for holding the sleeve within the hole of the workpiece as a mandrel is pulled through the nosepiece.

18. The nosepiece of claim 15, wherein the forward end portion of the pull gun is an adaptor that is removably connectable to the pull gun, the adaptor having a rear end adapted to mount to the pull gun.

19. The nosepiece of claim 18, wherein the rearward end portion of the sleeve-retainer piece includes a radial shoulder and both the extension and the adaptor have a radial end wall adapted to pressure engage the radial shoulder of the sleeve-retainer piece when threadably coupled to the sleeve-retainer piece.

20. The nosepiece of claim 18, wherein the forward end of the sleeve-retainer piece includes a conical surface for fitting into a flare at an end of a sleeve, and wherein during use the sleeve flare is clamped between the conical end of the sleeve-retainer piece and an edge of the hole in which the sleeve is located.

21. In combination:
a pull gun including a forward end portion having a central passageway and forward end threads,
a mandrel mount within the pull gun,
a plurality of elongated, tubular extensions of different lengths, but each including a rear end portion having rear end threads adapted to couple threadably with the forward end portion of the pull gun and each also having a front end portion including front end threads,
a tubular sleeve-retainer piece including a rearward end portion and a forward end portion, the forward end portion being formed by a multiple of circumferentially spaced alternate splits and fingers extending substantially axially forwardly from the rearward end portion, the rearward end portion of the tubular sleeve-retainer piece including rearward threads adapted to couple threadably both to the front end threads on the tubular extension and to the forward end threads on the pull gun forward end portion, and a plurality of mandrels, each mandrel having a rear end portion and a sleeve expanding front end portion, the rear end portion being connectable to the mandrel mount within the pull gun, whereby the nosepiece assembly can be utilized without the extension and with the sleeve-retainer piece directly coupled to the forward end portion of the pull gun, and with a first mandrel connected to the mandrel mount and extending forwardly from the pull gun through the tubular sleeve-retainer piece, and can also be utilized with a first extension mounted between the sleeve-retainer piece and the forward end portion of the pull gun, and with a second longer mandrel being connected at its rear end to the mandrel mount in the pull gun and extending forwardly from the pull gun through both the extension and the tubular sleeve-retainer piece, and can also be used with a second longer extension mounted between the sleeve-retainer piece and the forward end portion of the pull gun, and with a third still longer mandrel being connected at its rear end to the mandrel mount in the pull gun and extending forwardly from the pull gun through both the extension and the tubular sleeve-retainer piece.

22. The nosepiece of claim 21, wherein the rearward end portion of the sleeve-retainer piece includes a radial shoulder and both the extension and the forward end portion of the pull gun have a radial end wall adapted to pressure engage the radial shoulder on the sleeve-retainer piece when threadably coupled to the sleeve-retainer piece.

23. The nosepiece of claim 21, wherein the forward end of the sleeve-retainer piece includes a conical surface for fitting into a conical flare at an end of a sleeve, for holding the sleeve within the hole of the workpiece as a mandrel is pulled through the nosepiece.

24. The nosepiece of claim 21, wherein the forward end portion of the pull gun is an adaptor that is removably connectable to the pull gun, the adaptor having a rear end adapted to mount to the pull gun.

25. The nosepiece of claim 24, wherein the rearward end portion of the sleeve-retainer piece includes a radial shoulder and both the extension and the adaptor have a radial end wall adapted to pressure engage the radial shoulder of the sleeve-retainer piece when threadably coupled to the sleeve-retainer piece.

26. The nosepiece of claim 24, wherein the forward end of the sleeve-retainer piece includes a conical surface for fitting into a flare at an end of a sleeve, and wherein during use the sleeve flare is clamped between the conical end of the sleeve-retainer piece and an edge of the hole in which the sleeve is located.

27. A method of manufacturing an elongated, modular nosepiece for a puller gun that is used with a mandrel and a split sleeve for split sleeve cold expansion, the method comprising:

machining an adapter from a length of tubular stock of a selected strength and hardness, including providing the adapter with a rearward end portion adapted to be attached to a puller gun and a forward end portion having forward end threads;

machining an elongated, tubular extension from a length of tubular stock of a selected strength and hardness, including forming rear end threads on the extension that are adapted to couple threadably with the forward end threads on the adapter and also forming front end threads on the extension, machining a tubular, sleeve-retainer piece from a piece of stock steel, including forming a rearward end portion and a forward end portion, and forming the forward end portion to include a multiple of circumferentially-spaced, alternate splits and fingers extending substantially axially forwardly from the rearward end portion, and further forming the rearward end portion to include rearward threads adapted to couple threadably both to the front end threads on the tubular extension and to the forward end threads on the adapter, heat treating the machined sleeve retainer to provide it with a desired strength and hardness, whereby the sleeve-retainer piece can be heat treated after its manufacture to the desired strength and hardness, and whereby the nosepiece can be utilized without the extension and with the sleeve-retainer piece directly coupled to the adapter, and can be utilized with the extension mounted between the sleeve retainer and the adapter.

28. The method of manufacturing an elongated modular nosepiece of claim 27, wherein the step of heat treating the machined sleeve retainer includes biasing the fingers of the forward end portion radially inwardly until the outer ends of the fingers engage one another, heat treating the machined sleeve retainer with the fingers, in a static position, in a biased position, and removing the biasing means so that the fingers angle radially inwardly from the rearward end portion of the sleeve retainer to the outer ends of the fingers.

29. The method of manufacturing an elongated, modular nosepiece of claim 27, wherein the step of forming the rearward end portion to include rearward threads includes forming a flanged nipple in the rearward end portion, with the flanged nipple including a radial end wall.

30. The method of manufacturing an elongated, modular nosepiece of claim 27, wherein the step of machining an elongated, tubular extension includes forming the elongated, tubular extension from prehardened tubular stock.

31. The method of manufacturing an elongated, modular nosepiece of claim 27, wherein the step of machining an adapter includes forming the adapter from a length of prehardened tubular stock.

32. A nosepiece for use in combination with a pull gun for pulling an elongated mandrel, with a tubular bushing mounted on it, through a hole in a workpiece in order to expand radially the tubular bushing and cold work the workpiece, the nosepiece including:

a pull gun forward end portion having a central passageway and forward end threads, an elongated, tubular extension including a rear end portion having rear end threads adapted to couple threadably with the forward end threads of the pull gun forward end portion and also having a front end portion including front end threads, and a tubular, bushing-retainer piece including a rearward end portion and a forward end portion, the forward end portion formed by an annular projection extending substantially axially forwardly from the rearward end portion, the rearward end portion of the tubular bushing-retainer piece including rearward threads adapted to couple threadably both to the front end threads of the tubular extension and to the forward end threads of the pull gun forward end portion, whereby the nosepiece can be utilized without the extension and with the bushing-retainer piece directly coupled to the pull gun forward end portion, and can be utilized with the extension mounted between the retainer and the pull gun forward end portion.

33. The nosepiece of claim 32, wherein the rearward end portion of the bushing-retainer piece includes a radial shoulder and both the extension and the forward end portion of the pull gun have a radial end wall adapted to pressure engage the radial shoulder of the bushing-retainer piece when threadably coupled to the bushing-retainer piece.

34. The nosepiece of claim 32, wherein the annular projection of the forward end portion of the bushing-retainer piece is formed flush with the interior wall forming the tubular passageway of the tubular bushing-retainer piece.

35. The nosepiece of claim 32, and further comprising a plurality of elongated tubular extensions of different lengths, each including a rear end portion having threads adapted to couple threadably with the forward end threads on the forward end portion of the pull gun, and each also including a front end portion having front end threads, whereby the nosepiece can be utilized without an extension and with the bushing-retainer piece directly coupled to the forward end portion of the pull gun, and can also be used with a selected one of the plurality of elongated extensions mounted between the bushing-retainer piece and the forward end portion of the pull gun.

36. In combination:

a pull gun including a forward end portion having a central passageway and forward end threads, a mandrel mount within the pull gun, a plurality of elongated, tubular extensions of different lengths each including a rear end portion with rear end threads adapted to couple threadably with the forward end portion of the pull gun and also having a front end portion including front end threads, a tubular bushing-retainer piece including a rearward end portion and a forward end portion, the forward end portion being formed by an annular projection extending substantially axially forwardly from the rearward end portion, the rearward end portion of the tubular bushing-retainer piece including rearward threads adapted to couple threadably both to the front end threads of the tubular extension and to the forward end threads of the pull gun forward end portion, and a plurality of mandrels, each mandrel having a rear end portion and a bushing-expanding front end portion, the rear end portion being connectable to the mandrel mount within the pull gun, whereby the nosepiece assembly can be utilized without the extension and with the bushing-retainer piece directly coupled to the forward end portion of the pull gun, and with a first mandrel connected to the mandrel mount and extending forwardly from the pull gun through the tubular bushing-retainer piece, and can also be utilized with a first extension mounted between the bushing-retainer piece and the forward end portion of the pull gun, and with a second longer mandrel being connected at its rear end to the mandrel mount in the pull gun and extending forwardly from the pull gun through both the extension and the tubular bushing-retainer piece, and can also be used with a second longer extension mounted between the bushing-retainer piece and the forward end portion of the pull gun, and with a third still longer mandrel being connected at its rear end to the mandrel mount and the pull gun and extending forwardly from the pull gun through both the extension and the tubular bushing-retainer piece.

37. The combination of claim 36, wherein the mandrel mount within the pull gun comprises a quick release chuck assembly that includes a set of jaws that are openable and closeable, and wherein the plurality of mandrels each include a grooved recess at their inner ends, whereby the jaws of the mandrel mount clamp against the mandrel in the grooved recess portion when the jaws are in a closed position, and wherein with the jaws in an open position the mandrel can slide freely from the mandrel mount.

38. A tubular sleeve-retainer piece, comprising:

an elongated tubular body having a rearward end portion, a forward end portion, and an axial mandrel passageway extending throughout its length, said forward end portion including a plurality of circumferentially spaced alternate splits and fingers extending substantially axially forwardly from the rearward end portion, said fingers converging together as they extend forwardly from the rearward end portion, said mandrel passageway being cylindrical within the rearward end portion of the sleeve-retainer piece and tapering forwardly within the forward end portion of the sleeve-retainer piece, said converging fingers having interior surfaces which define the tapering portion of said mandrel passageway, said interior surfaces of said fingers defining a continuous and substantially constant taper throughout the tapering portion of said mandrel passageway, said forward end portion including a conical end surface that is adapted to fit within a conical flare at an end of an axially split cold-expansion sleeve;

said forward end portion of the sleeve retainer having a mandrel contacting edge at the forward end of the mandrel passageway;

said conical end surface extending forwardly to said mandrel contacting edge; and said internal surfaces of said fingers extending forwardly from the rearward end portion of the tubular body to said mandrel contacting edge.

39. The tubular sleeve-retainer piece of claim 38, wherein said rearward end portion includes external mounting threads.

40. The tubular sleeve-retainer piece of claim 39, further including a flange axially between the external mounting threads and the forward end portion of the tubular sleeve-retainer piece.

41. A tubular sleeve-retainer piece comprising:

an elongated tubular body having a rearward end portion, a forward end portion, and an axial mandrel passageway extending throughout its length, said forward end portion including a plurality of circumferentially spaced alternate splits and fingers extending substantially axially forwardly from the rearward end portion, said fingers converging together as they extend forwardly from the rearward end portion, said forward end portion including a conical forward end adapted to fit within a conical flare at an end of a split sleeve, said mandrel passageway being cylindrical within the rearward end portion of the sleeve-retainer piece and tapering forwardly slightly within the forward end portion of the sleeve-retainer piece, said forward end portion of the sleeve-retainer piece having a mandrel contacting edge at the forward end of the mandrel passageway, and wherein said rearward end portion includes external mounting threads.

42. In combination:

a forward end portion of a mandrel puller including a conical forward end portion tapering forwardly to a forward end, and a central axial opening which is internally threaded, said forward end surrounding said opening, and a tubular sleeve-retainer piece, comprising:

an elongated tubular body having a rearward end portion, a forward end portion, and an axial mandrel passageway extending throughout its length, said forward end portion being formed by a plurality of circumferentially spaced alternate splits and fingers extending substantially axially forwardly from the rearward end portion, said fingers converging together as they extend forwardly from the rearward end portion, said forward end portion including a conical forward end adapted to fit within a flare at the end of a split sleeve, said rearward end portion including external mounting threads connected to the internally threaded central axial opening, said mandrel passageway being cylindrical within the rearward end portion of the sleeve retainer and tapering forwardly slightly within the forward end portion of the sleeve retainer, and said forward end portion of the sleeve retainer having a mandrel contacting edge at the forward end of the mandrel passageway.

* * * * *